US007047223B2

(12) United States Patent
Watlington

(10) Patent No.: US 7,047,223 B2
(45) Date of Patent: May 16, 2006

(54) CLEAR TEXT TRANSMISSION SECURITY METHOD

(75) Inventor: Brenda Posey Watlington, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 603 days.

(21) Appl. No.: 09/896,701

(22) Filed: Jun. 29, 2001

(65) Prior Publication Data

US 2003/0004896 A1 Jan. 2, 2003

(51) Int. Cl.
*G06F 17/00* (2006.01)

(52) U.S. Cl. ............................ 705/72; 705/73; 705/50; 705/51; 713/184

(58) Field of Classification Search ................ 713/159, 713/170, 172, 176, 200–201, 182, 184; 380/200–204, 380/54; 705/51, 64, 72, 73, 50
See application file for complete search history.

(56) References Cited

U.S. PATENT DOCUMENTS 5,778,071 A * 7/1998 Caputo et al. ................ 380/25
6,212,504 B1 * 4/2001 Hayosh ....................... 705/64

FOREIGN PATENT DOCUMENTS

EP 000266748 A2 * 5/1988

OTHER PUBLICATIONS

IBM Technical Disclosure Bulleting; Title: Registration-based software security; Sep. 1, 1994; vol. No. 37.*
Hugo Amezquita et al, Software Specification for Everest Pin Pad 201/301 Emulation, Apr. 20, 1999, Version #: 1.01, pp. 1-65.

* cited by examiner

*Primary Examiner*—Elisca Pierre Eddy

(57) ABSTRACT

A clear text security method has a table of secure prompts stored in memory of a transaction terminal, such as memory of a PIN entry device, that is connected to a remote device. A data entry prompt in a display command is received by the transaction terminal followed by a command for entry of data into the transaction terminal to be transmitted as clear text data. Before accepting the data entry command, the transaction terminal compares the data entry prompt to prompts stored in a table of secured prompts. The transaction terminal accepts the data entry command only if the prompt included in the most recent display command received by the transaction terminal is a secure prompt. The transaction terminal determines that the data entry prompt is a secure prompt if it matches a prompt in the secure prompt table, matches only a portion of any secure prompt in the secure prompt table, or a any prompt in the secure prompt table matches only a portion of the data entry prompt.

12 Claims, 2 Drawing Sheets

CLEAR TEXT TRANSMISSION SECURITY METHOD

FIELD OF THE INVENTION

The present invention relates to transmission of clear-text data, and more particularly, to the transmission of clear text data by customer 0useable transaction terminals.

BACKGROUND OF THE INVENTION

Transaction terminals are utilized in a variety of environments, such as retail establishments, automatic teller machines, gas pump payment terminals, and the like. These transaction terminals often have personal identification number (PIN) entry devices. These PIN entry devices typically include a keypad for entering data into the PIN entry device and a display for displaying messages to the customer, including prompting for the entry of data. The PIN entry device is often interfaced to a credit card reader to permit credit card numbers to be input into the PIN entry device by "swiping" them through the reader. Many of the messages displayed on the display are sent to the PIN entry device by the remote controller. The PIN entry device is typically linked to a remote device, such as a remote controller, such as via a network.

A concern with PIN entry devices that are linked to remote controllers via a network is that a hacker could hack into the network and monitor data that is being sent from the PIN entry device to the remote controller. To avoid the hacker obtaining sensitive data, such as credit card numbers and personal identification numbers, PIN entry devices have utilized security schemes to protect the data being sent to remote controllers, such as DES encryption. (Other types of encryption could also be used, such as double and triple DES, AES, RSI and PKI.) In this regard, in Jul., 1997, the Associations of Visa and MasterCard published a document entitled "Joint Point-Of-Sale PIN-Entry-Device Security Requirements," commonly referred to as the PED Spec., in which they outlined what they considered to be "minimum acceptable security standards" in PIN entry devices.

In some transaction terminals, however, it is desirable that the PIN entry device be able to transmit clear text data to the remote controller. In the context of this application, the term "clear text data" or transmission of data in "clear text form" means data that is transmitted in a standard format, such as ASCII, without securing it using techniques such as encryption. For example, in some applications of PIN entry devices used on gas pumps, non-sensitive data, such as odometer readings and license numbers, is entered by the user via the PIN entry device and sent to the remote terminal as clear text data. An example of such an application would be a fueling station for a commonly owned fleet of vehicles where the fleet owner collects data, such as odometer readings of the vehicles, each time the vehicles are fueled in order to better manage the fleet of vehicles. This type of data is typically transmitted as clear text data to avoid the overhead involved in encrypting it.

A problem presented by the transmission of clear text data from the PIN entry device to the remote controller is that if a hacker is able to hack into the network connecting the PIN entry device to the remote controller, the hacker could emulate the remote controller sending a data entry prompt to the PIN entry device so that the PIN entry device displays the hacker's prompt. The hacker's prompt could be a prompt for the entry of sensitive information, such as credit card numbers or PINs. If a user then keys this information into the PIN entry device and it is transmitted in clear text form, the hacker would then be able to obtain the sensitive information with the possibility that this sensitive information would then be used for improper purposes, such as fraudulent ATM withdrawals.

To avoid sensitive information being transmitted in clear text form, the PED Spec. requires that data that is entered into the PIN entry device can be transmitted to the remote controller as "clear text" data only if it was input in response to a data entry prompt that is a "secure prompt." In this regard, a "secure prompt" as that term is used herein means a prompt that prompts for the entry of non-sensitive data, such as odometer readings.

In order to comply with the PED Spec. requirements governing the transmission of clear text data, manufacturers of PIN entry devices have included a table of secure prompts in the memory of the PIN entry devices. The PIN entry device then transmits in clear text form data that is entered into it only if the data entry prompt received from the remote controller matches one of the secure prompts in the table.

A problem presented by the above described technique of matching the data entry prompt with the prompts in the secure prompt table is that remote controllers made by different manufacturers often use somewhat different prompts to prompt for the entry of the same information. For example, prompts for the entry of the user's zip code might take the form of "ENTER ZIP" or "ENTER ZIPCODE." To accommodate the variations in these prompts, manufacturers of PIN entry devices have heretofore included each secure prompt variation in the secure prompt table. This, however, increases the size of the secure prompt table with a consequent increase in the amount of memory used to store it.

It is an objective of this invention to allow for variations in secure prompts without storing each variation in the secure prompt table.

SUMMARY OF THE INVENTION

A clear text security method in accordance with this invention has a table of secure prompts stored in memory of a transaction terminal, such as memory of a PIN entry device, that is connected to a remote device. Upon receipt of a display command having a data entry prompt followed by the receipt of a command for entry of data into the transaction terminal to be transmitted back to the remote device as clear text data, the data entry prompt is compared to prompts stored in a table of secured prompts. Data entered into the transaction terminal is transmitted in clear text form only if the data entry prompt matches any prompt in the secure prompt table, matches only a portion of any prompt in the secure prompt table, or any prompt in the secure prompt table matches only a portion of the data entry prompt.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
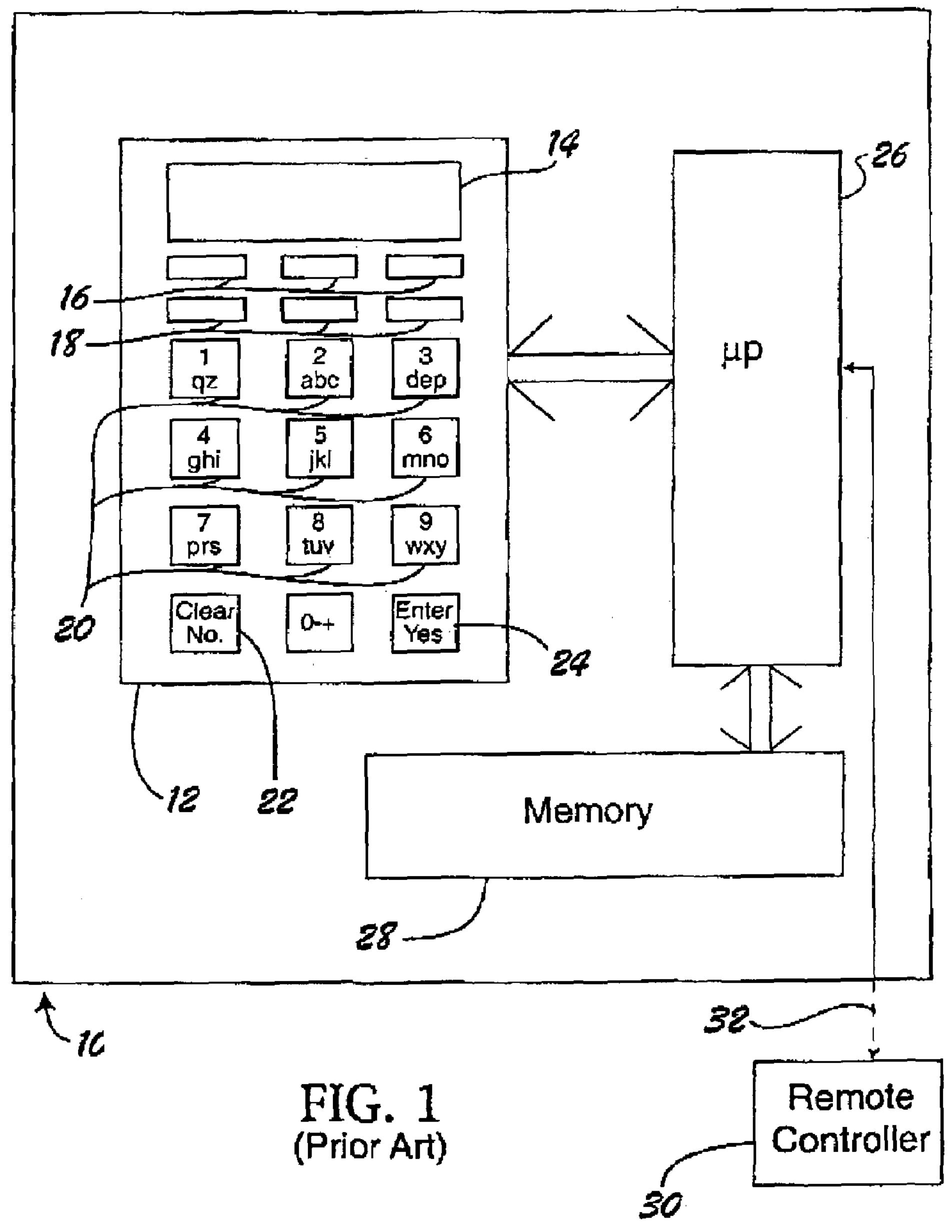
FIG. 1 is a block diagram of a prior art personal identification number entry device.

Referring to FIG. 1, a simplified block diagram of a prior art PIN entry device 10 is shown. PIN entry device 10 has a keyboard/display 12 which has a display 14, such as a 2×16 dot matrix vacuum fluorscent display, a plurality of screen addressable keys 16, a plurality of soft function keys 18, alpha/numeric keys 20, Clear No key 22 and Enter/Yes key 24. PIN entry device 10 further includes a computing device 26, such as a microprocessor coupled to keyboard/display 12 and to memory 28. PIN entry device 10 is coupled to a remote controller 30, such as by network 32. A table of secured prompts, comparable to those shown in Table 1 below is stored in memory 28 of PIN entry device 10.

In operation, PIN entry device 10 and remote controller 30 exchange data messages over network 32. Among them are messages sent by remote controller 30 to PIN entry device 10 that include prompts to be displayed on display 14 of PIN entry device 10 that prompt the user of PIN entry device 10 to enter information, such as with alpha/numeric keys 20.

One type of prompt sent by remote controller 30 to PIN entry device 10 is to prompt for input of non-sensitive information that is then transmitted to remote controller 30 by PIN entry device 10. Once the information is entered and the user presses Enter/Yes key 24, the information that the user entered is transmitted by PIN entry device 10 to remote controller 30. If the prompt requested the user to enter sensitive information, such as a credit card number or a PIN number, the information is secured, such as by encryption, before it is transmitted to remote controller 10. On the other hand, if the prompt requests input of non-sensitive information, the information is transmitted to remote controller 30 in clear text form.

As discussed above, to protect against sensitive information being input in response to a "bogus" prompt resulting in it being transmitted to remote controller 30 in clear text form, PIN entry device 10 transmits data input in response to a prompt as clear text data only when the data entry prompt for the data that is input matches a prompt in the secured prompt table. Heretofore, however, that data entry prompt has had to match exactly a prompt in the secured prompt table. In this regard, the display command sent to PIN entry device 10 by remote controller 32 can include a number for the data entry prompt instead of the data entry prompt. The PIN entry device 10 then displays the prompt corresponding to the data entry prompt number and the determination of whether the data entry prompt is a secure prompt can be made based on whether the prompt number for the data entry prompt is in the table of secured prompts.

Figure 2:
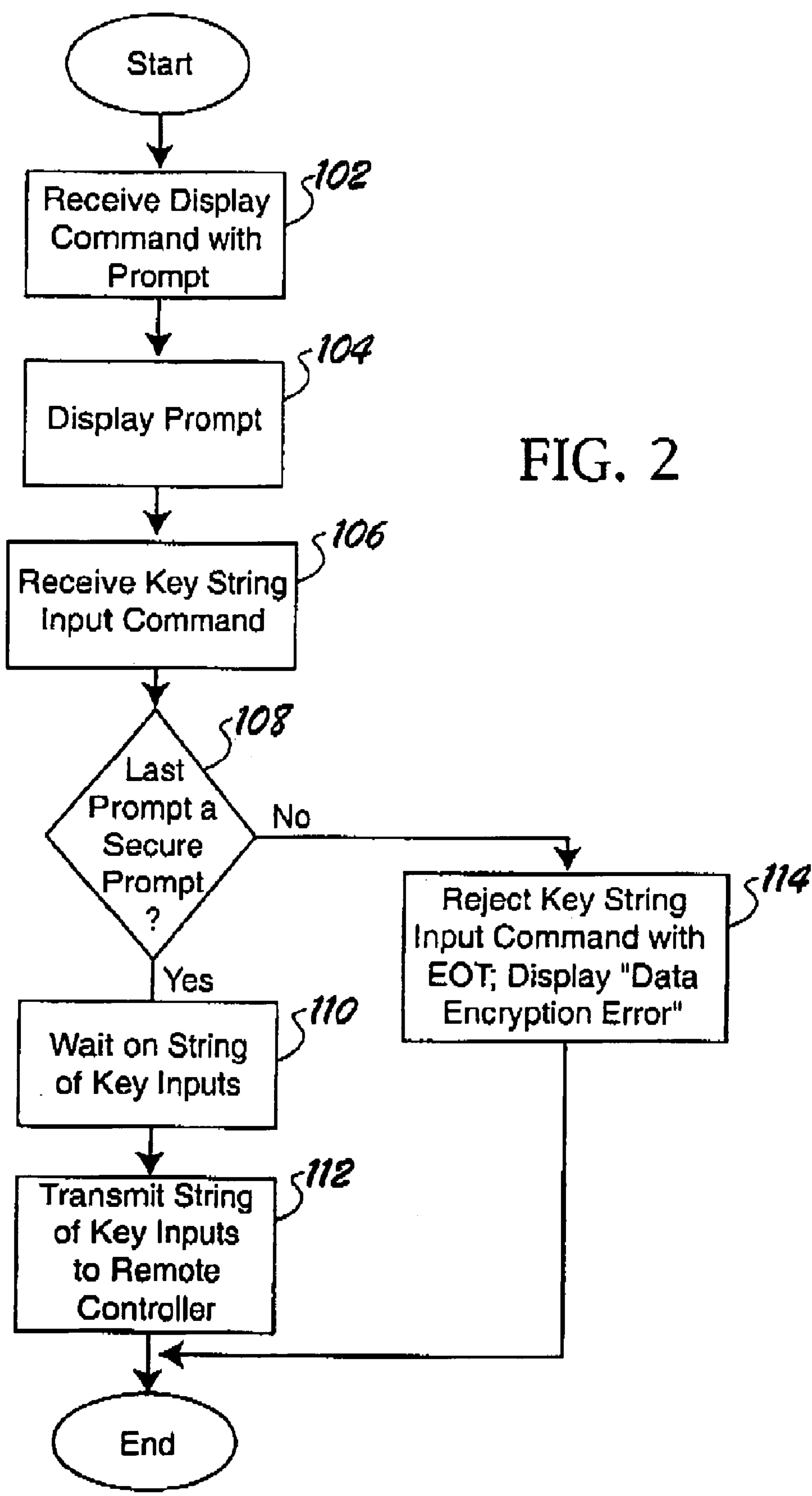
FIG. 2 is a flow chart of the method of the invention.

FIG. 2 is a flow chart of the method of the present invention that can advantageously be implemented in a PIN entry device, such as prior art PIN entry device 10. The inventive method will be described in the context of implementation in prior art PIN entry device 10. However, describing the inventive method in the context of implementation in prior art PIN entry device 10 is not to be construed as indicating in any way that the inventive method is in the prior art.

At block 102, PIN entry device 10 receives a display command from remote controller 30 that includes a prompt (or prompt number of the prompt) to be displayed on keyboard/display 12 of PIN entry device 10. At block 104, PIN entry device 10 then displays the prompt on keyboard/display 12. The display command is followed by a key string input command received at block 106 by PIN entry device 10 from remote controller 30 that directs PIN entry device 10 to wait for a string of key inputs from keypad/display 12 and upon their input, to transmit them as clear text data to remote controller 30. Before accepting the key string input command, PIN entry device 10, at block 108, compares the data entry prompt received in the display command with the prompts in the table of secured prompts. Table 1 is an illustrative table of secure prompts.

TABLE 1

| Message Number | Line 1 | Line 2 |
|---|---|---|
| Message 1 | ENTER VEHICLE | |
| Message 2 | ENTER ODOMETER | |
| Message 3 | ENTER DRIVER | |
| Message 4 | ENTER LIC | |
| Message 5 | ENTER JOB | |
| Message 6 | ENTER CODE | |
| Message 7 | ENTER DATA | |
| Message 8 | ENTER USER DATA | |
| Message 9 | ENTER DEPT | |
| Message 10 | ENTER ZIPCODE | |
| Message 11 | PLEASE ENTER 5 | DIGIT ZIP |
| Message 12 | ENTER USER ID | |
| Message 13 | ENTER CUSTOMER | DATA |
| Message 14 | ENTER EXPIRATION | |
| Message 15 | ENTER AUTH | |
| Message 16 | ENTER ACCOUNT | |
| Message 17 | ENTER AMOUNT | |
| Message 18 | ENTER VALUE | |
| Message 19 | ENTER CARD | |
| Message 20 | ENTER TAG | |
| Message 21 | ENTER KEYFOB | |
| Message 22 | ENTER PRODUCT | |
| Message 23 | ENTER POINTS | |
| Message 24 | ENTER FREQUENT | |
| Message 25 | ENTER CLUB | |
| Message 26 | ENTER CAR WASH | |
| Message 27 | ENTER FOOD | |
| Message 28 | ENTER SERVICE | |
| Message 29 | ENTER MENU | |
| Message 30 | ENTER STORE | |
| Message 31 | ENTER MESSAGE | |
| Message 32 | ENTER LOCATION | |
| Message 33 | ENTER EMPLOYEE | |
| Message 34 | ENTER REF | |

If the data entry prompt matches any prompt in the table of secure prompts (or the prompt number for the prompt is in the table of secure prompts), or if the data entry prompt matches only a portion of any prompt in the table of secure prompts, or if any prompt in the table of secured prompts matches only a portion the data entry prompt, PIN entry device 10 determines that the data entry prompt was a secure prompt and waits on a string of key inputs from keyboard/display 12 at block 110. For example, if the data entry prompt was "ENTER ZIP," since this matches the first part of the "ENTER ZIPCODE" prompt in the secure prompt table, PIN entry device 10 would determine that the "ENTER ZIP" data entry prompt was a secure prompt. Similarly, if the data entry prompt was "ENTER DRIVE #" or "ENTER DRIVE ID," PIN entry device 10 would determine that this data entry prompt was also a secure prompt in that the "ENTER DRIVER" prompt in the secure prompt table matches the first part of these data entry prompts. In making the comparison, spaces and alphabetic cases are preferably ignored.

If PIN entry device 10 determines that the data entry prompt is a secure prompt, then, upon entry of the string of key inputs, PIN entry device 10 transmits them as clear text data to remote controller 30 at block 112. If, at block 108, PIN entry device 10 determines that the data entry prompt is not a secure prompt, it then rejects at block 114 the key string input command by sending an end-of-transmission (EOT) message to remote controller 30 and displaying on keypad/display 12 an error message, such as "DATA ENCRYPTION ERROR."

By accommodating variations in secure prompts for the entry of the same information into PIN entry device 10, the inventive method reduces the number of entries required in the secure prompt table stored in memory 28, thus reducing the amount of memory required to store the secure prompt table.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A security method for transmission to a remote device of data input into a transaction terminal as clear text data, comprising the steps of:

(a) comparing a data entry prompt for entry of data into the transaction terminal to prompts in a secure prompt table;

(b) determining that the data entry prompt is a secure prompt upon the occurrence of any of the conditions of:

(i) the data entry prompt matching at least one of the prompts in the secure prompt table, (ii) the data entry prompt matching only a portion of any of the secure prompts in the secure prompt table, and (iii) any of the prompts in the secure prompt table matching only a portion of the data entry prompt; and (c) transmitting the data entered into the transaction terminal in response to the data entry prompt as clear text data only upon the determination that the data entry prompt is a secure prompt.

2. A security method for transmission to a remote device of data input into a transaction terminal as clear text data, comprising the steps of:

(a) comparing a data entry prompt for entry of data into the transaction terminal to prompts in a secure prompt table;

(b) determining that the data entry prompt is a secure prompt upon the occurrence of any of the conditions of:

(i) the data entry prompt matching any prompt in the secure prompt table, and (ii) the data entry prompt matching only a portion of any prompt in the secure prompt table; and (c) transmitting the data entered into the transaction terminal in response to the data entry prompt as clear text data only upon the determination that the data entry prompt is a secure prompt.

3. The method of claim 2, wherein the step of determining that the data entry prompt is a secure prompt includes also doing so when any prompt in the secure prompt table matches only a portion of the data entry prompt.

4. A security method for transmission to a remote device of data input into a transaction terminal as clear text data, comprising the steps of:

(a) comparing a data entry prompt for entry of data into the transaction terminal to prompts in a secure prompt table;

(b) determining that the data entry prompt is a secure prompt upon the occurrence of any of the conditions of:

(i) the data entry prompt matching any prompt in the secure prompt table, and (ii) any prompt in the secure prompt table matching only a portion of the data entry prompt; and (c) transmitting the data entered into the transaction terminal in response to the data entry prompt as clear text data only upon the determination that the data entry prompt is a secure prompt.

5. The method of claim 4, wherein the step of determining that the data entry prompt is a secure prompt includes also doing so when the data entry prompt matches only a portion of any prompt in the secure prompt table.

6. The method of claim 5, wherein the step of determining that the data entry prompt is a secure prompt includes also doing so when any of the secure prompts matches only a portion of the data entry prompt.

7. In a personal identification number entry device, a clear text data transmission security method, comprising the steps of:

(a) the personal identification number entry device receiving a data entry prompt for the entry of data from a remote device followed by a command from the remote device for entry of data into the personal identification number entry device;

(b) the personal identification number entry device comparing the data entry prompt to a plurality of secure prompts and determining that the data entry prompt is a secure prompt upon the occurrence of any of the conditions of (i) the data entry prompt matching any of the secure prompts, and (ii) the data entry prompt matching only a portion of any of the secure prompts;

(c) the personal identification number entry device accepting the data entry command only upon the determination that the data entry prompt is a secure prompt.

8. In a personal identification number entry device, a clear text data transmission security method, comprising the steps of:

(a) the personal identification number entry device receiving a data entry prompt for the entry of data from a remote device followed by a command from the remote device for entry of data into the personal identification number entry device;

(b) the personal identification number device comparing the data entry prompt to a plurality of secure prompts and determining that the data entry prompt is a secure prompt upon the occurrence of any of the conditions of:

(i) the data entry prompt matching any of the secure prompts, and (ii) any of the secure prompts matching only a portion of the data entry prompt; and (c) the personal identification number device accepting the data entry command only upon the determination that the data entry prompt is a secure prompt.

9. The method of claim 8 wherein the step of determining that the data entry prompt is a secure prompt includes also doing so when the data entry prompt matches only a portion of any of the secure prompts.

10. In a data entry device that displays a data entry prompt received from a remote device and transmits data input into the data entry device in response to the data entry prompt as clear text data only if the data entry prompt is a secure prompt, an improved method of determining whether the data entry prompt is a secure prompt, comprising the steps of:

(a) comparing the data entry prompt with prompts in a secure prompts table; and (b) determining that the data entry prompt is a secure prompt upon the occurrence of any of the conditions of:

(i) the data entry prompt matching any prompt in the secure prompt table, (ii) the data entry prompt matching only a portion of any prompt in the secure prompt table, and (iii) any prompt in the secure prompt table matching only a portion of the data entry prompt.

11. The method of claim 10 wherein the data entry device comprises a personal identification number entry device.

12. In a personal identification number entry device that displays a data entry prompt received from a remote device and transmits data input into the data entry device in response to the data entry prompt as clear text data only if the data entry prompt is a secure prompt, an improved method of determining whether the data entry prompt is a secure prompt, comprising the steps of:

(a) storing a plurality of secure prompts in a secure prompt table in memory of the personal identification number entry device;

(b) comparing the data entry prompt with the secure prompts stored in the secure prompt table; and (c) determining that the data entry prompt is a secure prompt upon the occurrence of any of the conditions of:

(i) the data entry prompt matching any secure prompt in the secure prompt table, (ii) the data entry prompt matching only a portion of any secure prompt in the secure prompt table, and (iii) any secure prompt in the secure prompt table matching only a portion of the data entry prompt.

* * * * *